(12) United States Patent
Sakayama et al.

(10) Patent No.: US 12,030,533 B2
(45) Date of Patent: Jul. 9, 2024

(54) BRAKE LINING FOR RAILWAY VEHICLE

(71) Applicant: NIPPON STEEL CORPORATION, Tokyo (JP)

(72) Inventors: Yuiko Sakayama, Tokyo (JP); Takanori Kato, Tokyo (JP); Naohito Yuasa, Tokyo (JP); Naruo Miyabe, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 379 days.

(21) Appl. No.: 17/593,354

(22) PCT Filed: Mar. 5, 2020

(86) PCT No.: PCT/JP2020/009457
§ 371 (c)(1),
(2) Date: Sep. 16, 2021

(87) PCT Pub. No.: WO2020/195683
PCT Pub. Date: Oct. 1, 2020

(65) Prior Publication Data
US 2022/0169293 A1    Jun. 2, 2022

(30) Foreign Application Priority Data

Mar. 25, 2019  (JP) .................................. 2019-055844

(51) Int. Cl.
*F16D 69/04*     (2006.01)
*B61H 5/00*      (2006.01)
*F16D 65/092*    (2006.01)

(52) U.S. Cl.
CPC ............. *B61H 5/00* (2013.01); *F16D 65/092* (2013.01); *F16D 69/0408* (2013.01); *F16D 2069/0433* (2013.01)

(58) Field of Classification Search
CPC .... F16D 65/092; F16D 69/00; F16D 69/0408; F16D 2069/0433; B61H 5/00
(Continued)

(56) References Cited

U.S. PATENT DOCUMENTS 5,934,418 A    8/1999  Wirth
8,919,503 B2*  12/2014 Hiramatsu ............ F16D 65/092
                                                    188/73.31
(Continued)

FOREIGN PATENT DOCUMENTS

CN    205715389 U    11/2016
CN    205745032 U    11/2016
(Continued)

*Primary Examiner* — Christopher P Schwartz
(74) *Attorney, Agent, or Firm* — Greer Burns & Crain Ltd.

(57) ABSTRACT

A brake lining includes a mounting plate, sliding members and elastic members. The sliding members are arranged in the transverse direction and the longitudinal direction of the mounting plate on one surface of the mounting plate to form transverse rows and longitudinal rows. The elastic members are provided in correspondence with the sliding members. Each of the elastic members is disposed between the corresponding sliding member and the mounting plate. A gap exists between adjacent transverse rows, and extends over the entire length of the transverse rows. A gap exists between adjacent longitudinal rows, and extends over the entire length of the longitudinal rows. The gap has a width that is smaller than a width of the gap.

2 Claims, 7 Drawing Sheets

(58) Field of Classification Search
USPC .................. 188/73.1, 73.2, 250 B, 250 G
See application file for complete search history.

(56) References Cited

U.S. PATENT DOCUMENTS

| | | | |
|---|---|---|---|
| 10,718,392 B2 * | 7/2020 | Fuderer | ................... F16D 69/04 |
| 2018/0259018 A1 | 9/2018 | Fujimoto et al. | |
| 2018/0328432 A1 | 11/2018 | Niessner et al. | |
| 2018/0347654 A1 * | 12/2018 | Sakayama | ........... F16D 69/0408 |

FOREIGN PATENT DOCUMENTS

| | | | | |
|---|---|---|---|---|
| CN | 207598770 U | | 7/2018 | |
| CN | 110375018 A | * | 10/2019 | ............ F16D 65/04 |
| JP | 10507250 A | | 7/1998 | |
| JP | 2007155107 A | | 6/2007 | |
| JP | 2008138781 A | | 6/2008 | |
| JP | 2011214628 A | | 10/2011 | |
| JP | 5816043 B2 | | 11/2015 | |
| JP | 2018517107 A | | 6/2018 | |
| WO | WO-2014121703 A1 | * | 8/2014 | ........... F16D 65/092 |
| WO | 2017069140 A1 | | 4/2017 | |

\* cited by examiner

BRAKE LINING FOR RAILWAY VEHICLE

TECHNICAL FIELD

The present disclosure relates to a brake lining for a railway vehicle.

BACKGROUND ART

Conventionally, disc brake devices are widely used as braking devices for railway vehicles. A disc brake device includes an annular brake disc and a brake lining. The brake disc is mounted to, for example, a wheel of a railway vehicle, and rotates together with the wheel. The brake lining is pressed against a sliding surface of the brake disc. Friction between the brake lining and the brake disc applies a braking force to the wheel.

As disclosed in Patent Literature 1, a brake lining of a disc brake device for a railway vehicle generally includes a plurality of sliding members. The plurality of sliding members are mounted to a brake caliper via a mounting plate, and face the sliding surface of the brake disc. In the brake lining of Patent Literature 1, three sliding members which each have a circle or a hexagon shape in front view are supported by one back board to constitute a group member. A plurality of group members are fixed to the mounting plate.

Patent Literature 2 discloses a brake lining that includes a guide plate. In Patent Literature 2, the guide plate having a plurality of guide holes is disposed on a mounting plate. A back board that supports a discoid sliding member is inserted in the respective guide holes. An elastic member is disposed in a compressed state between each back board and the mounting plate.

Patent Literature 3 discloses a brake lining that includes friction structures having an oval track shape in front view. Each of the friction structures has two sliding members that are integrally formed, and a groove which is provided between the sliding members. Back boards which support the respective friction structures have the same oval track shape as the friction structure. Two elastic members are provided between each back board and the mounting plate, in correspondence with the two sliding members.

Patent Literature 4 discloses a brake lining in which a plurality of sliding members are arranged with a gap therebetween along the circumferential direction of a brake disc against which the brake lining is pressed. These sliding members have grooves extending in the circumferential direction, except for the sliding members located at both ends in the circumferential direction of the brake disc.

Patent Literature 5 discloses a brake lining in which a plurality of sliding members are arranged in two rows along the circumferential direction of a brake disc against which the brake lining is pressed. A gap is formed between the row of sliding members located on the outer circumferential side of the brake disc and the sliding members located on the inner circumferential side of the brake disc. Each of the sliding members has a groove extending in the circumferential direction of the brake disc.

Patent Literature 6 discloses a brake lining in which sliding members having a polygonal shape in front view are disposed on a mounting plate. Each of the sliding members is in contact with an adjacent sliding member. Each sliding member is elastically supported by an elastic member.

CITATION LIST

Patent Literature

Patent Literature 1: Japanese Translation of PCT International Application Publication No. 10-507250
Patent Literature 2: Japanese Patent No. 5816043
Patent Literature 3: International Application Publication No. WO2017/069140
Patent Literature 4: Japanese Patent Application Publication No. 2011-214628
Patent Literature 5: Japanese Patent Application Publication No. 2007-155107
Patent Literature 6: Japanese Translation of PCT International Application Publication No. 2018-517107

SUMMARY OF INVENTION

Technical Problem

For example, when a railway vehicle is traveling through a region with heavy snowfall, snow sometimes enters a gap formed between sliding members in the brake lining. In a case where snow that enters a gap between sliding members is not discharged and stays in the gap for a long time, the movement of each sliding member is restricted by the snow, and the ability of each sliding member to follow the brake disc decreases. Consequently, sliding members locally contact the brake disc, and the temperature of the brake disc repeatedly rises and falls locally. As a result, there is a risk that thermal fatigue damage of the brake disc may occur.

In the brake linings of Patent Literatures 1 and 2, there are gaps surrounded by three or more sliding members. Snow that entered such a gap is obstructed by the sliding members that surround the gap and cannot move out from the gap, and therefore the snow stays in the gap for a long time. In this case, the ability of each sliding member to follow the brake disc is reduced by the snow, and sliding members locally contact the brake disc, and the brake disc repeatedly rises and falls in temperature locally. Hence, in the brake linings of Patent Literatures 1 and 2, there is a risk of causing thermal fatigue damage to the brake disc.

In the brake lining of Patent Literature 3, friction structures having an oval track shape in front view are disposed at various orientations. Some of the friction structures are disposed so as to intersect with the traveling direction of the railway vehicle. Therefore, even if snow that has entered gaps between friction structures is subjected to wind pressure accompanying traveling of the railway vehicle, in some cases the friction structures which intersect with the traveling direction obstruct the discharge of the snow, and the snow stays in the gaps. Consequently, in the brake lining of Patent Literature 3 also, the ability of the respective sliding members to follow the brake disc may decrease due to snow. In this case, sliding members locally contact the brake disc, and local rises and falls in temperature repeatedly occur in the brake disc. Consequently, there is a risk that thermal fatigue damage will be caused to the brake disc.

On the other hand, in the brake lining of Patent Literature 4, a gap that extends in the radial direction of the brake disc is formed between the sliding members. In a state in which the brake lining is mounted to a brake caliper, this gap is approximately parallel to the traveling direction of the railroad vehicle. Therefore, snow that has entered the gap is easily discharged by wind pressure accompanying the traveling of the railway vehicle.

In a case where snow that entered a gap between sliding members melts and changes to water, and the water then adheres to the brake disc and/or the sliding member, the coefficient of friction between the brake disc and the sliding member decreases. When the coefficient of friction decreases, the stopping distance of the railway vehicle when a braking force is applied by the disc brake device lengthens.

Therefore, it is necessary to prevent water from adhering to the brake disc and the sliding member as much as possible.

In Patent Literature 4, grooves are formed in almost all of the sliding members. In a state in which the brake lining is mounted to the brake caliper, these grooves extend in substantially the vertical direction. Therefore, the water adhering to the sliding member falls down along the groove. However, in Patent Literature 4, grooves are not formed in the sliding members at the upper end and the lower end. Therefore, there is a possibility that the water that flows through the grooves of the respective sliding members will be dammed up by the sliding member at the lower end, and will adhere to the sliding member. When water adheres to the sliding member, the coefficient of friction between the brake disc and the sliding member decreases.

In the brake lining of Patent Literature 5, a gap is formed between a row of sliding members located on the outer circumferential side of the brake disc and sliding members located on the inner circumferential side of the brake disc. In a state in which the brake lining is mounted to the brake caliper, the gap extends from a sliding member at the upper end to a sliding member at the lower end. This gap can guide water from the sliding member at the upper end to the sliding member at the lower end and thereby cause the water to fall off.

However, in Patent Literature 5, the gap between the sliding members that extends in the vertical direction has a comparatively large width. Hence, it is easy for snow to enter the gap. Since the adhesive force of snow is greater than the adhesive force of water, snow that entered the gap is less likely to fall down than water, and there is a possibility that the snow will stay in the gap. In this case, similarly to the brake linings of Patent Literatures 1 to 3, the ability of the respective sliding members to follow the brake disc will decrease. Further, water flowing through the gap will be dammed up by the retained snow, and therefore water will be more liable to adhere to the respective sliding members. Hence, there is a risk that the coefficient of friction between the brake disc and the sliding members will decrease.

In the brake lining of Patent Literature 6, there are no gaps between the sliding members. Therefore, the ability of the sliding members to follow the brake disc does not decrease due to entry of snow into a gap. However, in Patent Literature 6, adjacent sliding members are disposed in contact with each other. Consequently, the movement of each sliding member is restricted by another sliding member, and the sliding members cannot follow the brake disk which undergoes thermal deformation during braking of the wheel. In other words, in Patent Literature 6, the constant pressure performance of the sliding members with respect to the brake disc is not originally secured, and the sliding members come into local contact with the brake disc. Hence, there is a risk that the brake lining of Patent Literature 6 may cause thermal fatigue damage to the brake disc, similarly to Patent Literatures 1 to 3.

An objective of the present disclosure is to provide a brake lining for a railway vehicle that can secure constant pressure performance of sliding members with respect to a brake disc, while preventing a decrease in the coefficient of friction between the brake disc and the sliding members.

Solution to Problem

A brake lining according to the present disclosure is a brake lining for a railway vehicle. The brake lining includes a mounting plate, a plurality of sliding members, and a plurality of elastic members. The plurality of sliding members are arranged in a transverse direction and a longitudinal direction of the mounting plate on one surface of the mounting plate to form a plurality of transverse rows and a plurality of longitudinal rows. The plurality of elastic members are provided in correspondence with the plurality of sliding members. Each of the plurality of elastic members is disposed between a corresponding sliding member and the mounting plate. Between the transverse rows that are adjacent, a first gap exists over an entire length of the transverse rows. Between the longitudinal rows that are adjacent, a second gap exists over an entire length of the longitudinal rows. The second gap has a width that is smaller than a width of the first gap.

Advantageous Effects of Invention

According to the brake lining for a railway vehicle of the present disclosure, a decrease in the coefficient of friction between a brake disc and sliding members can be prevented, and the constant pressure performance of the sliding members with respect to the brake disc can be secured.

DESCRIPTION OF EMBODIMENTS

Figure 1:
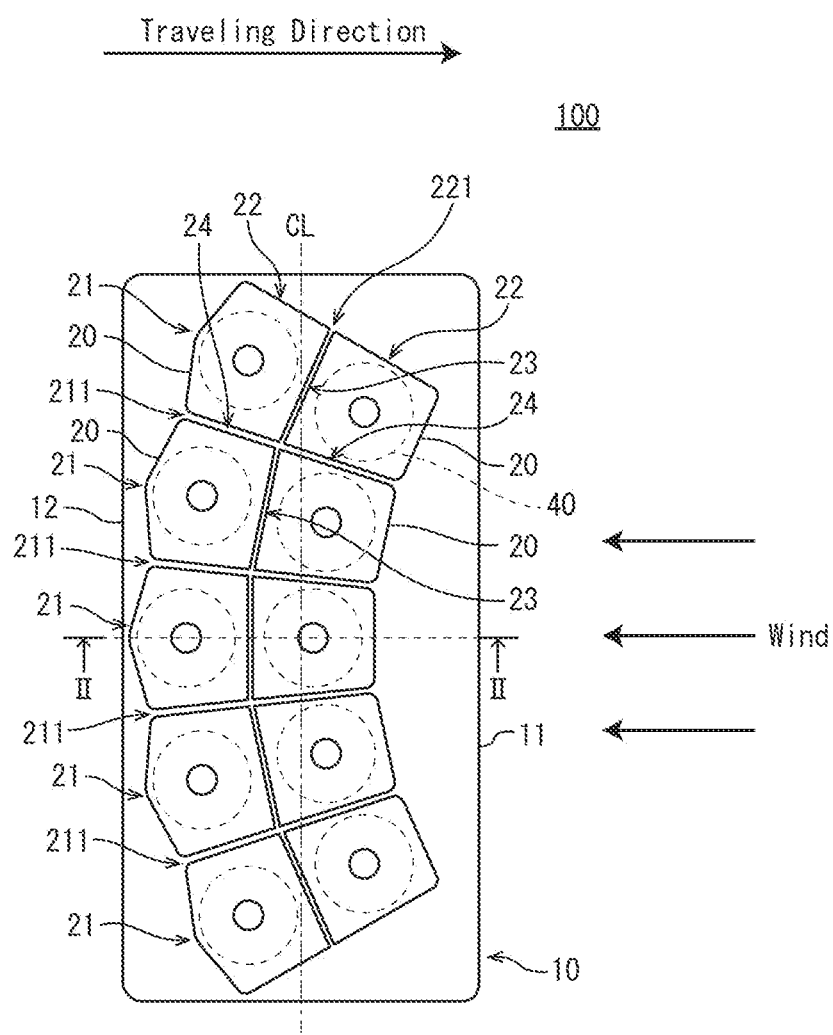
FIG. 1 is a front view illustrating a schematic configuration of a brake lining for a railway vehicle according to an embodiment.

A brake lining according to one embodiment is a brake lining for a railway vehicle. The brake lining includes a mounting plate, a plurality of sliding members, and a plurality of elastic members. The plurality of sliding members are arranged in a transverse direction and a longitudinal direction of the mounting plate on one surface of the mounting plate to form a plurality of transverse rows and a plurality of longitudinal rows. The plurality of elastic members are provided in correspondence with the plurality of sliding members. Each of the plurality of elastic members is disposed between a corresponding sliding member and the mounting plate. Between the transverse rows that are adjacent, a first gap exists over an entire length of the transverse rows. Between the longitudinal rows that are adjacent, a second gap exists over an entire length of the longitudinal rows. The second gap has a width that is smaller than a width of the first gap (first configuration).

According to the first configuration, by arranging a plurality of sliding members in the transverse direction and the longitudinal direction of a mounting plate, a plurality of transverse rows of the sliding members and a plurality of longitudinal rows of the sliding members are formed. A first gap is provided between adjacent transverse rows, and extends over the entire length of the transverse rows. A second gap is provided between adjacent longitudinal rows, and extends over the entire length of the longitudinal rows. A brake lining for a railway vehicle is generally mounted to a brake caliper in a manner so that the longitudinal direction of the mounting plate is substantially the vertical direction. Therefore, in a state in which the brake lining is mounted to the brake caliper, the second gap between the longitudinal rows extends from the upper end of the sliding member group to the lower end thereof. By means of the second gap, water that is produced when snow melts can be guided from the upper end to the lower end of the sliding member group, and can ultimately be discharged to outside of the sliding member group. Hence, adherence of water to the sliding members can be prevented, and thereby the coefficient of friction between the brake disc and the sliding members can be maintained.

In a state in which the brake lining is mounted to the brake caliper, the first gap between the transverse rows extends approximately parallel to the traveling direction of the railroad vehicle. Therefore, even if snow enters the first gap, the snow is subjected to wind pressure accompanying traveling of the railway vehicle, and is blown off to outside of the sliding member group along the first gap. By this means, the retention of snow between sliding members can be prevented. Hence, the respective sliding members are not hindered from following the brake disc by snow, and thereby the constant pressure performance of the sliding members with respect to the brake disc can be secured. Because of the high constant pressure performance of the sliding members, the area of contact between the brake disc and the sliding members can be enlarged, and a local rise in the temperature of the brake disc can be prevented. As a result, the occurrence of thermal fatigue damage in the brake disc can be prevented.

According to the first configuration, the width of the second gap between the longitudinal rows of the sliding members is smaller than the width of the first gap between the transverse rows of the sliding members. It is difficult for snow to enter the second gap that has a narrow width. Therefore, the flow of water within the second gap is not obstructed by snow, and drainage of water from the second gap can be reliably performed. Hence, adherence of water to the sliding members can be more reliably prevented, and a decrease in the coefficient of friction between the brake disc and the sliding member can be prevented.

Because the transverse rows are arranged with the first gap therebetween, and the longitudinal rows are arranged with the second gap therebetween, each sliding member does not come into contact with other sliding members. Further, each sliding member is elastically supported by an elastic member. Therefore, each sliding member can follow the brake disc which undergoes thermal deformation during braking, without interfering with other sliding members. Thus, the constant pressure performance of the sliding members can be secured.

Preferably, the sliding members arranged in the longitudinal direction have the same shape and size (second configuration).

In the second configuration, sliding members that are arranged side by side in the longitudinal direction of the mounting plate all have the same shape and size. Hence, the kinds of sliding members to be prepared when producing the brake lining can be reduced, and the production cost and the number of processes can be decreased.

An embodiment of the present disclosure is described hereunder while referring to the accompanying drawings. In the drawings, the same reference symbols are assigned to the same or equivalent parts, and a description thereof is not repeated.

[Configuration of Brake Lining]

Figure 2:
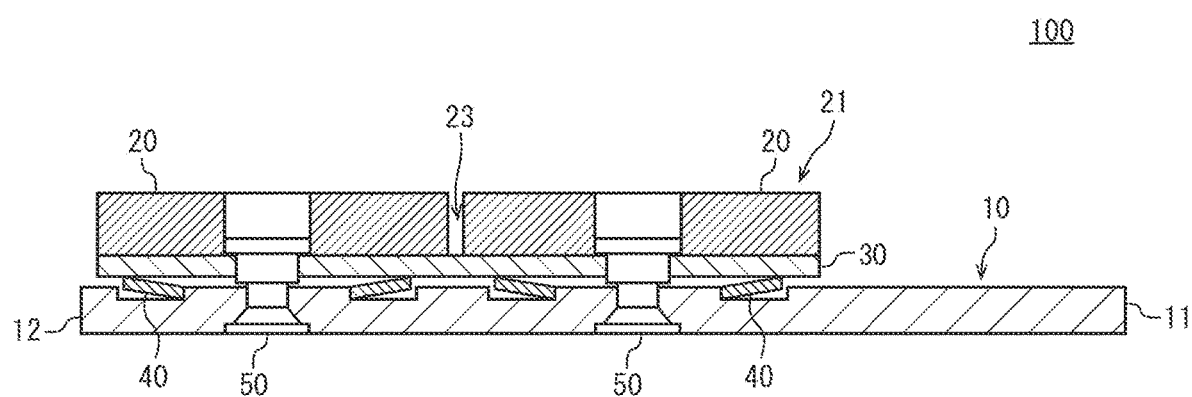
FIG. 2 is a cross-sectional view along a line II-II of the brake lining illustrated in FIG. 1.

FIG. 1 is a front view illustrating the schematic configuration of a brake lining 100 for a railway vehicle according to the present embodiment. FIG. 2 is a cross-sectional view along a line II-II of the brake lining 100 illustrated in FIG. 1.

The brake lining 100 is one part of a disc brake device of a railway vehicle. The disc brake device includes an unshown brake disc and brake caliper, in addition to the brake lining 100. The brake disc is fastened to a disc body (for example, a wheel) that is fixed to an axle. The brake lining 100 is mounted to the brake caliper so as to face the brake disc. FIG. 1 illustrates the brake lining 100 in a posture in which the brake lining 100 is mounted to the brake caliper.

As illustrated in FIG. 1 and FIG. 2, the brake lining 100 includes a mounting plate 10, a plurality of sliding members 20, a plurality of back plates 30, and a plurality of elastic members 40.

Referring to FIG. 1, the mounting plate 10 is directly or indirectly mounted to the brake caliper. In the present embodiment, the mounting plate 10 has an substantially rectangular shape in front view. In a state in which the mounting plate 10 is mounted to the brake caliper, among two side edges 11 and 12 of the mounting plate 10, one side edge 11 faces the inner circumferential side of the brake disc, and the other side edge 12 faces the outer circumferential side of the brake disc. Hereinafter, in the brake lining 100, the side edge 11 side may be referred to as the inner side in the radial direction or the inner circumferential side, and the side edge 12 side may be referred to as the outer side in the radial direction or the outer circumferential side.

In front view of the mounting plate 10, a longitudinal center line CL passes through the middle between the side edge 11 and the side edge 12. In a state in which the mounting plate 10 is mounted to the brake caliper, the longitudinal center line CL extends in the vertical direction. The direction in which the longitudinal center line CL extends is the longitudinal direction of the mounting plate 10, and the direction orthogonal to the longitudinal center line CL is the transverse direction of the mounting plate 10.

Each of the sliding members 20 is a plate shape, and has a polygonal shape in front view. More specifically, each of the sliding members 20 has a substantially quadrangular shape or a substantially pentangular shape. The sliding members 20 are supported on one surface of the mounting plate 10. The sliding members 20 are arranged in the transverse direction and the longitudinal direction of the mounting plate 10, and form a plurality of transverse rows 21 and a plurality of longitudinal rows 22. The sliding members 20 do not need to be arranged completely along the transverse direction and the longitudinal direction of the mounting plate 10, and it suffices that the sliding members 20 are arranged substantially in the transverse direction and the longitudinal direction. In the present embodiment, the sliding members 20 are substantially arranged along the radial direction and the circumferential direction of the brake disc, and form a plurality of transverse rows 21 and a plurality of longitudinal rows 22. A gap 23 is provided between the sliding members 20 that are adjacent in the transverse direction. A gap 24 is provided between the sliding members 20 that are adjacent in the longitudinal direction. Therefore, the respective sliding members 20 do not come in contact with another sliding member 20.

Each transverse row 21 is constituted by a plurality of sliding members 20 that are arranged side-by-side in the transverse direction. In the present embodiment, one transverse row 21 is constituted by two of the sliding members 20. A gap 211 exists between adjacent transverse rows 21. The gap 211 is formed by the gaps 24 between sliding members 20 that are adjacent in the longitudinal direction being formed in continuity with each other in the transverse direction. Each of the gaps 211 extends over the entire length of the transverse rows 21. In other words, each of the gaps 211 extends uninterruptedly from an end on the inner circumferential side to an end on the outer circumferential side of the plurality of sliding members 20 arranged on the mounting plate 10. In the present embodiment, each gap 211 extends substantially straight along the radial direction of the brake disc. The gaps 211 are arranged radially from the inner circumferential side toward the outer circumferential side.

Each longitudinal row 22 is constituted by a plurality of sliding members 20 that are arranged side-by-side in the longitudinal direction. In the present embodiment, one longitudinal row 22 is constituted by five of the sliding members 20. A gap 221 exists between adjacent longitudinal rows 22. The gap 221 is formed by gaps 23 between sliding members 20 that are adjacent in the transverse direction being formed in continuity with each other in the longitudinal direction. The gap 221 extends over the entire length of the longitudinal row 22. In other words, the gap 221 extends uninterruptedly from the upper end to the lower end of the plurality of sliding members 20 arranged on the mounting plate 10. In the present embodiment, the gap 221 curves and extends substantially along the circumferential direction of the brake disc.

Each longitudinal row 22 is constituted by sliding members 20 of equal shape and size. In other words, sliding members 20 that have the same shape and size are arranged in the longitudinal direction of the mounting plate 10. More specifically, on the inner circumferential side of the mounting plate 10, sliding members 20 that have an substantially quadrangular shape in front view are arranged side-by-side in the longitudinal direction. On the outer circumferential side of the mounting plate 10, sliding members 20 that have an substantially pentangular shape in front view are arranged side-by-side in the longitudinal direction. In the brake lining 100 according to the present embodiment, two kinds of sliding members 20 are used.

Referring to FIG. 2, a back plate 30 is fixed to a face (back face) of the sliding members 20 on the mounting plate 10 side. In the present embodiment, one back plate 30 is fixed to every two of the sliding members 20. More specifically, the back plates 30 are provided in correspondence with the transverse rows 21 which each consist of two sliding members 20. The shape and size of the back plate 30 are not particularly limited. For example, the back plate 30 can have approximately the same shape and size as the shape and size of the transverse row 21 in front view of the brake lining 100.

In the example illustrated in FIG. 2, two sliding members 20 that are fixed to one back plate 30 are separate bodies. However, these two sliding members 20 may be integrated on the back plate 30 side. In other words, in the case of fixing two or more sliding members 20 to one back plate 30, these sliding members 20 can be integrally formed as long as the gap 23 is maintained.

Elastic members 40 are provided in correspondence with the sliding members 20. In other words, one of the elastic members 40 is provided for each of the sliding members 20. The respective elastic members 40 are disposed between the back plate 30 to which the corresponding sliding members 20 is fixed and the mounting plate 10. Whilst the elastic member 40 is typically a Belleville washer, it may be a leaf spring or a coil spring or the like. The sliding member 20, the back plate 30 and the elastic member 40 are mounted to the mounting plate 10 by means of a fastening component 50 such as a rivet.

Figure 3:
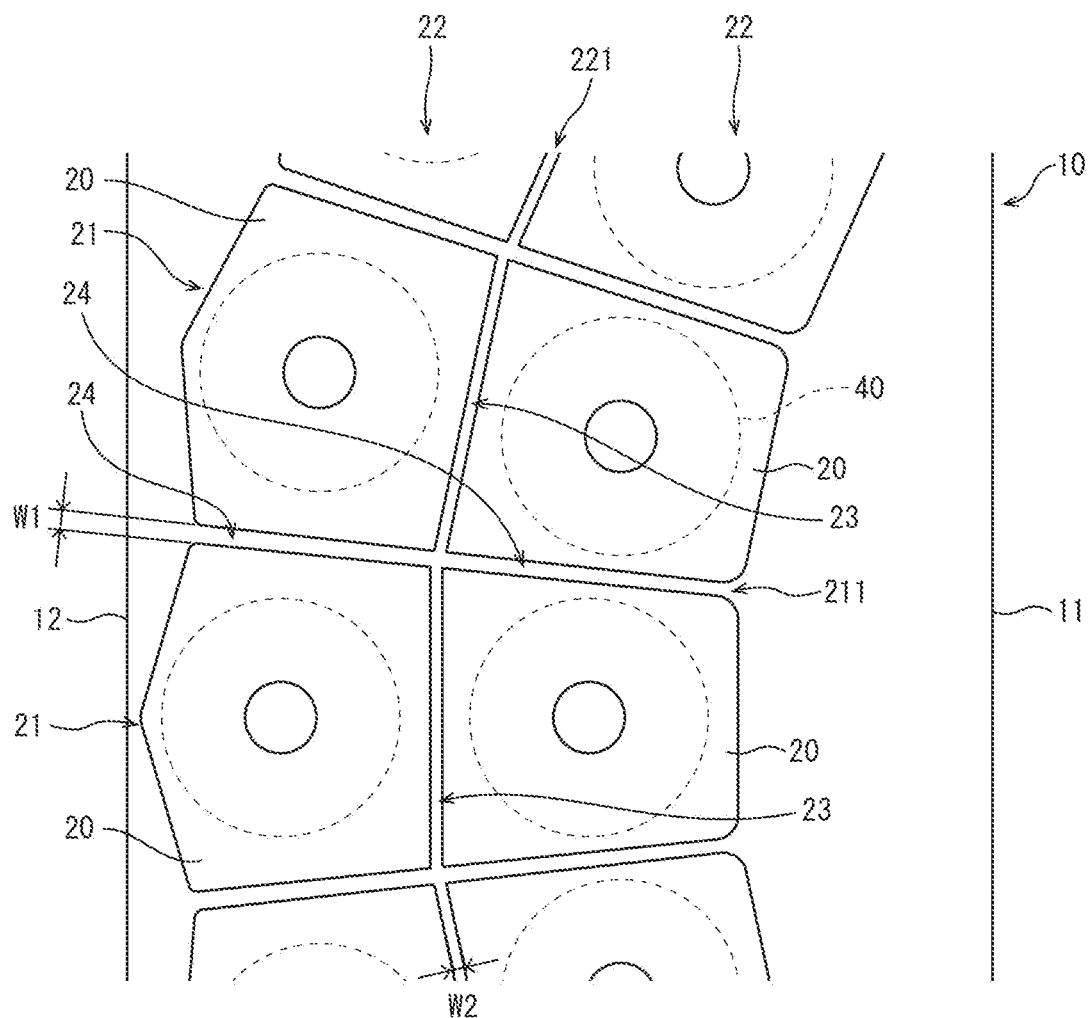
FIG. 3 is a partial enlarged view of the brake lining illustrated in FIG. 1.
Figure 4A:
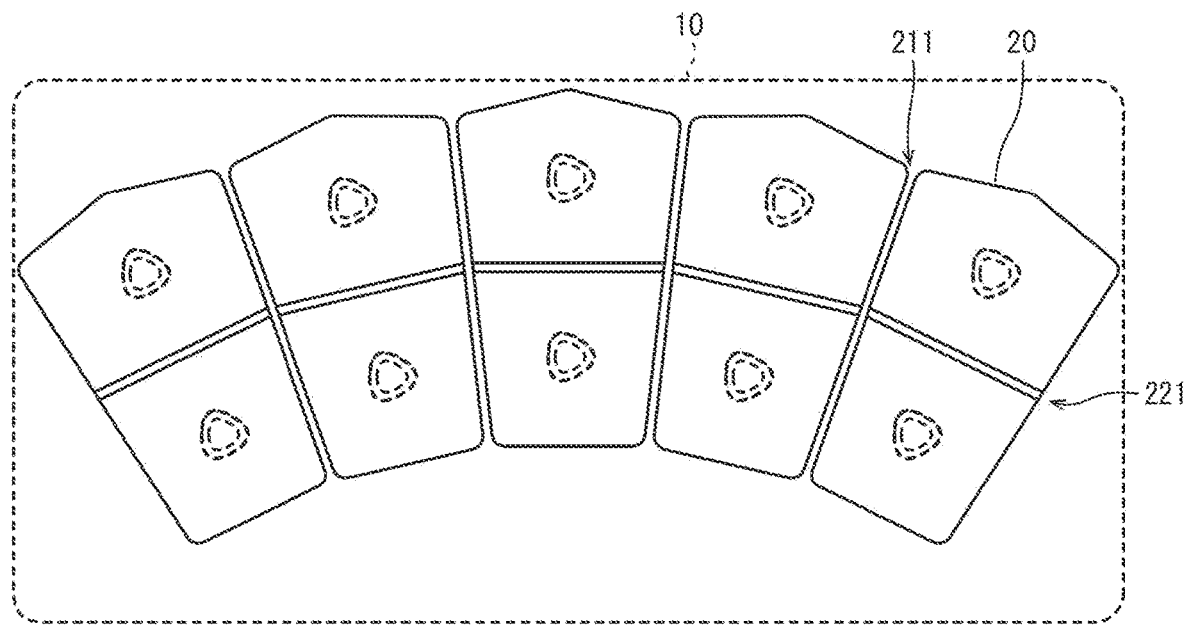
FIG. 4A is a front view of the brake lining for a railway vehicle according to the embodiment.
Figure 4B:
FIG. 4B is a rear-side view of the brake lining illustrated in FIG. 4A.
Figure 4C:
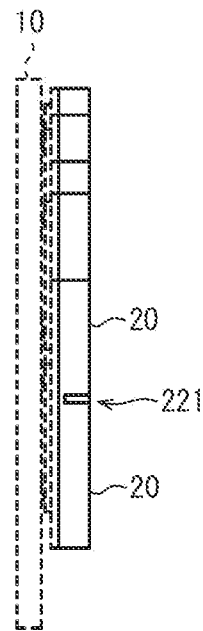
FIG. 4C is a left-side view of the brake lining illustrated in FIG. 4A.
Figure 4D:
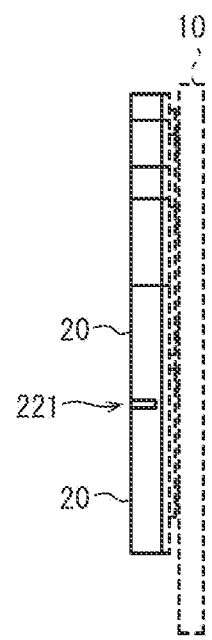
FIG. 4D is a right-side view of the brake lining illustrated in FIG. 4A.
Figure 4E:
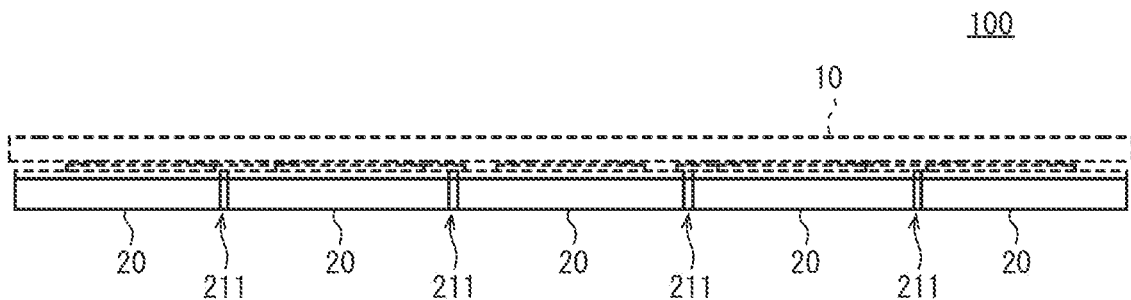
FIG. 4E is a plan view of the brake lining illustrated in FIG. 4A.
Figure 4F:
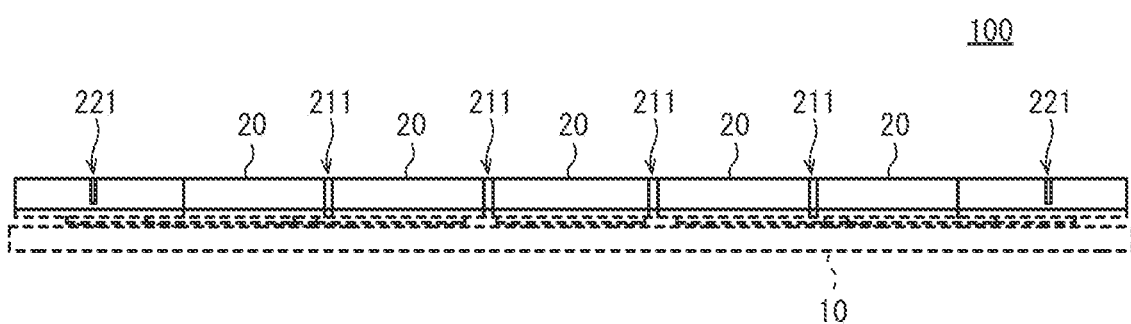
FIG. 4F is a bottom view of the brake lining illustrated in FIG. 4A.

FIG. 3 is a partial enlarged view of the brake lining 100 illustrated in FIG. 1. Referring to FIG. 3, the gap 211 between the transverse rows 21 has a width W1. The width W1 is the distance between adjacent transverse rows 21. The width W1 is preferably 2.0 mm to 5.0 mm.

As mentioned above, the gap 211 between the transverse rows 21 is formed by the continuity of the gaps 24 between the sliding members 20 that are adjacent in the longitudinal direction. For example, in front view of the brake lining 100, in a case where the positions of adjacent gaps 24 deviate relative to each other, the width of the gap 211 partially decreases at the boundary between the gaps 24. In this case, the width of the gap 211 at the position of the boundary between the gaps 24 is treated as the width W1 of the gap 211. In other words, the width W1 of the gap 211 is the minimum width of the gap 211 extending in the transverse direction.

The gap 221 between the longitudinal rows 22 has a width W2. The width W2 is the distance between the adjacent longitudinal rows 22. The width W2 is preferably 0.3 mm to 3.0 mm. The width W2 is smaller than the width W1 of the gap 211 between the transverse rows 21. The width W1 is, for example, 1.5 times or more greater than the width W2.

As mentioned above, the gap 221 between the longitudinal rows 22 is formed by the continuity of the gaps 23 between sliding members 20 that are adjacent in the transverse direction. For example, in front view of the brake lining 100, in a case where the positions of adjacent gaps 23 deviate relative to each other, the width of the gap 221 partially decreases at the boundary between the gaps 23. In this case, the width of the gap 23 at the position of the boundary is treated as the width W2 of the gap 221. In other words, the width W2 of the gap 221 is the minimum width of the gap 221 extending in the longitudinal direction.

Advantageous Effects of Embodiment

When the brake lining 100 according to the present embodiment is mounted to the brake caliper, the longitudinal direction of the mounting plate 10 is substantially the vertical direction. Therefore, the gap 221 between the longitudinal rows 22 of the sliding members 20 extends vertically over the entire length of the longitudinal rows 22. The gap 211 between the transverse rows 21 of the sliding members 20 extends approximately parallel to the traveling direction of the railroad vehicle over the entire length of the transverse rows 21.

For example, when a railway vehicle equipped with the brake lining 100 travels through a region with heavy snowfall, snow may sometimes enter between the sliding members 20. However, the snow is subjected to wind pressure accompanying traveling of the railway vehicle (FIG. 1), and is guided rearward by the gap 211 and is discharged from between the sliding members 20. Therefore, it is difficult for snow to remain between the sliding members 20, and the movement of the sliding members 20 is not liable to be obstructed by snow. Hence, the ability of the sliding members 20 to follow the brake disc can be secured. Thus, because the area of contact between the brake disc and the sliding members 20 can be enlarged, local rises in temperature of the brake disc can be prevented.

Snow that enters between the sliding members 20 and comes in contact with the sliding members 20 melts and changes to water. The water falls down along the gap 221 and is discharged to outside of the sliding members 20. Furthermore, the width W2 of the gap 221 extending in the vertical direction is smaller than the width W1 of the gap 211 that is approximately parallel to the traveling direction of the railway vehicle. Therefore, it is comparatively difficult for snow to enter the gap 221. Hence, the flow of water in the gap 221 is not obstructed by snow, and the water can be smoothly drained from the gap 221. As a result, adherence of water to the sliding members 20 can be prevented, and the coefficient of friction between the brake disc and the sliding members 20 can be maintained.

In the present embodiment, each sliding member 20 does not come in contact with another sliding member 20, and is elastically supported by the elastic member 40. Therefore, each sliding member 20 can follow the brake disc which undergoes thermal deformation during braking, without interfering with another sliding member 20. Hence, the constant pressure performance of the sliding members 20 can be secured.

Thus, according to the brake lining 100 of the present embodiment, the ability of the sliding members 20 to follow the brake disc is not liable to decrease due to snow, and the constant pressure performance of the sliding members 20 can be secured. Consequently, because it is difficult for local contact between the sliding members 20 and the brake disc to occur, thermal fatigue damage of the brake disc that accompanies such kind of local contact can be prevented. Further, according to the brake lining 100 of the present embodiment, a decrease in the coefficient of friction of the sliding members 20 due to adherence of water can be prevented. Therefore, lengthening of the stopping distance of the railway vehicle during braking can be suppressed.

In the present embodiment, taking into consideration the amount of deformation of the brake disc during braking, preferably the width W2 of 0.3 mm or more is secured in the narrow gap 221 that extends in the vertical direction. In a case where the width W2 of the narrow gap 221 is 0.3 mm or more, the width W1 of the wide gap 211 extending in the traveling direction of the railway vehicle will of course be greater than 0.3 mm. If the sliding members 20 are arranged at intervals of 0.3 mm or more in this way, even when the sliding members 20 follow deformation of the brake disc, the sliding members 20 will usually not interfere with each other.

In the present embodiment, preferably the width W1 of 2.0 mm or more is secured in the wide gap 211. It is considered that the maximum grain size of snow that enters between the sliding members 20 is about 1.0 mm, and therefore if the width W1 is set to 2.0 mm or more and is thus made sufficiently larger than the maximum grain size of snow, it will be difficult for snow to stay inside the gap 211, and the snow can be smoothly discharged from the gap 211.

In the brake lining 100 according to the present embodiment, sliding members 20 that are arranged in the longitudinal direction have the same shape and size. In this case, the number of kinds of the sliding members 20 included in the brake lining 100 may be less than or equal to the number of the longitudinal rows 22. In other words, the number of kinds of sliding members 20 to be prepared when producing the brake lining 100 can be reduced. Thus, the production cost and the number of processes required to produce the brake lining 100 can be reduced.

In the brake lining 100 according to the present embodiment, the width W1 of the gap 211 between the sliding members 20 is preferably set to 5.0 mm or less. The width W2 of the gap 221 between the sliding members 20 is preferably set to 3.0 mm or less. The widths W1 and W2 are smaller than the width of a gap between the sliding members in a common brake lining. Therefore, the surface area of the sliding members 20 that come in contact with the disc brake device is increased, and the wear margin of the sliding members 20 can be increased. Thus, the life of the brake lining 100 can be extended.

An embodiment according to the present disclosure has been described above. However, the present disclosure is not limited to the above embodiment, and various changes are possible within a range that does not deviate from the gist of the present disclosure.

In the above embodiment, the mounting plate 10 has an substantially rectangular shape in front view. FIG. 4A to FIG. 4F are a front view, a rear-side view, a left-side view, a right-side view, a plan view, and a bottom view, respectively, of the brake lining 100 having the mounting plate 10 that is an substantially rectangular shape. However, the shape of the mounting plate 10 is not limited to this shape and, for example, the mounting plate 10 may have a shape that curves along the circumferential direction of the brake disc or the like.

In the above embodiment, the respective gaps 211 between the transverse rows 21 extend along the radial direction of the brake disc. However, the direction in which the respective gaps 211 extend may be the horizontal direction. The gap 211 need not extend completely parallel to the transverse direction of the mounting plate 10, and it suffices that the gap 211 extends in substantially the transverse direction.

In the above embodiment, the gap 221 between the longitudinal rows 22 extends along the circumferential direction of the brake disc. However, the direction in which the gap 221 extends may be the vertical direction, or may be a direction which is somewhat inclined with respect to the vertical direction. The gap 221 need not extend completely parallel to the longitudinal direction of the mounting plate 10, and it suffices that the gap 221 extends in substantially the longitudinal direction.

A groove extending in the longitudinal direction of the mounting plate 10 may be formed on the surface of each of the sliding members 20. In order to secure a large surface area of the sliding members 20 and increase the life of the brake lining 100, the number of grooves provided in each sliding member 20 is preferably one or less.

REFERENCE SIGNS LIST

100: Brake Lining
10: Mounting Plate
20: Sliding Member
21: Transverse Row
211: Gap
W1: Width
22: Longitudinal Row
221: Gap
W2: Width
40: Elastic Member

The invention claimed is:

1. A brake lining for a railway vehicle, comprising:
a mounting plate;
a plurality of sliding members arranged in a transverse direction and a longitudinal direction of the mounting plate on one surface of the mounting plate to form a plurality of transverse rows and a plurality of longitudinal rows; and
a plurality of elastic members provided in correspondence with the plurality of sliding members, the elastic members each being disposed between a corresponding sliding member and the mounting plate;
wherein:
between the transverse rows that are adjacent, a first gap exists over an entire length of the transverse rows;
between the longitudinal rows that are adjacent, a second gap having a width that is smaller than a width of the first gap exists over an entire length of the longitudinal rows:
a plurality of transverse gaps are provided between the respective sliding members that are adjacent in the transverse direction, the transverse gaps having a constant width; and
a plurality of longitudinal gaps are provided between the respective sliding members that are adjacent in the longitudinal direction, the longitudinal gaps having a constant width.

2. The brake lining according to claim 1, wherein:
the sliding members arranged in the longitudinal direction have a same shape and size.

* * * * *